United States Patent [19]

Gemmell et al.

[11] 4,383,254

[45] May 10, 1983

[54] CONTROL APPARATUS FOR A DISPLAY MATRIX

[76] Inventors: David Gemmell, 15 Downside, Belmont, Sutton, Surrey; Anthony Longley, 4 Everest Rd., Crowthorne, Berkshire; Duncan Irvine, 108 Rowland Way, Prebendal Farm Estate, Aylesbury, Buckinghamshire, all of England

[21] Appl. No.: 186,803

[22] Filed: Sep. 12, 1980

[30] Foreign Application Priority Data

Sep. 14, 1979 [GB] United Kingdom ................ 7931939

[51] Int. Cl.$^3$ ............................................. G09G 3/00
[52] U.S. Cl. .................................. 340/712; 340/802; 340/815.06
[58] Field of Search ...................... 340/378.3, 802, 712

[56] References Cited

U.S. PATENT DOCUMENTS

| | | | |
|---|---|---|---|
| 3,187,321 | 6/1965 | Kameny | 340/712 |
| 3,737,898 | 6/1973 | Cross, Jr. | 340/378.3 |
| 3,818,448 | 6/1974 | Wilkins | 340/378.3 |
| 3,824,723 | 7/1974 | Gargas | 340/378.3 |
| 4,101,884 | 7/1978 | Benton, Jr. | 340/378.3 |
| 4,241,521 | 12/1980 | Dufresne | 340/802 |

*Primary Examiner*—Marshall M. Curtis
*Attorney, Agent, or Firm*—Robert F. O'Connell

[57] ABSTRACT

A display matrix of LEDs responds to two coordinate display input signals representative of display positions each defined by a respective LED in the matrix, an input switch unit adapted for use by a disabled person being coupled to the matrix, so that the user can selectively actuate any one of a plurality of the LEDs, by a microprocessor equipped with an ROM holding the operating program for the microprocessor and an RAM in which sets of position coordinates of the matrix can be temporarily stored and recalled under the control of the user so that the user can write a message into the RAM by selecting a sequence of matrix positions corresponding to a sequence of words visibly displayed at respective LEDs and subsequently recall and display the message by selecting a read position in the matrix.

6 Claims, 9 Drawing Figures

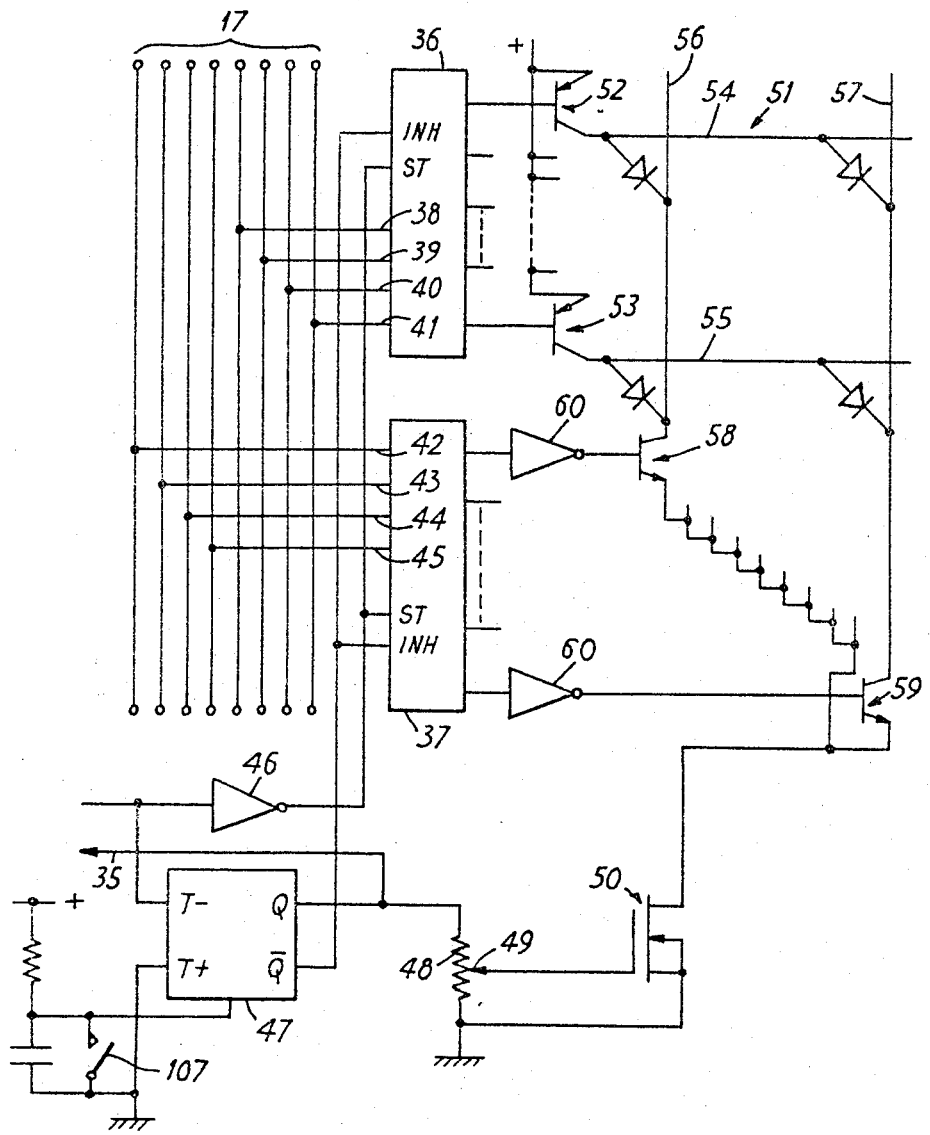

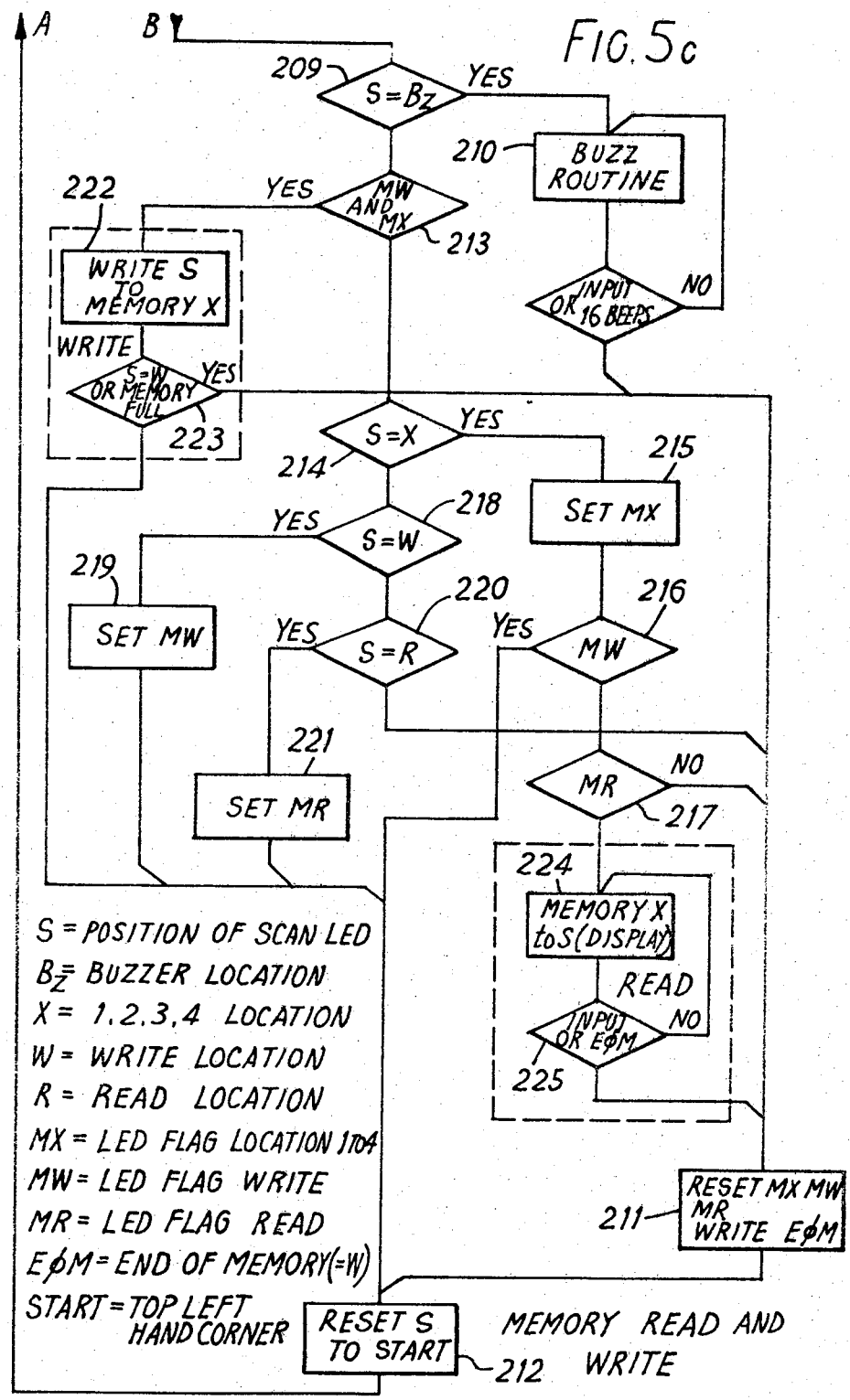

CONTROL APPARATUS FOR A DISPLAY MATRIX

This invention relates to control apparatus for a display matrix, especially, but not exclusively, for a display matrix adapted for use as a means of communication by a disabled person.

The invention relates to such control apparatus of the type having a display matrix responsive to display input signals representative of display positions in the matrix, input means actuable by a user, and means coupling the input means to the display matrix in such a manner that by actuating the input means a user can selectively actuate any one of a plurality of display positions in the display matrix.

Examples of control apparatus of the type defined are described in British patent specification No's. 956,302 and 1,021,531. Typically in such known apparatus the display matrix provides the user with an indication of which one of a plurality of pieces of equipment, for example a radio, a television, a telephone, a page turner and an alarm is in operation under the control of the control apparatus. Such control apparatus may also be used to control an electric typewriter, each operation of the typewriter being selectable by use of the display matrix. In particular, where such apparatus is intended to be used by a severely disabled person, the input means is typically in the form of one or two on/off switches, possibly adapted to be controlled by air pressure by sucking and/or blowing by the user, the operations of the switch or switches being automatically responded to by the apparatus to provide the user with a method of initiating, controlling and terminating a scanning of the display positions of the display matrix. Control apparatus for a pair of comparison matrices for testing and teaching purposes is described in U.S. Patent application, Ser. No. 115,765, filed Jan. 28, 1980.

The present invention arises from the need of severely disabled patients for a means of rapid communication of basic requests and responses to a helper.

SUMMARY OF THE INVENTION

According to the present invention, therefore, control apparatus of the type defined is characterised in that the means coupling the input means to the display matrix includes a central processor unit coupled to a control memory and to a temporary memory. The display matrix includes a writing display position, in response to the selected actuation of which the central processor unit can store a plurality of sets of display position data in a predetermined ordered group of sets of locations in the temporary memory, and a reading display position, in response to the selected actuation of which the central processor unit automatically actuates in the predetermined order the plurality of display positions corresponding to the plurality of sets of display position data stored in the said sets of locations in the temporary memory.

Preferably the display matrix includes an erasing display position in response to selection of which during actuation of the writing display position the most recent set of display position data is erased.

The control memory may be a read only memory programmed to determine a mode of operation of the central processor unit in response to predetermined signals from the input means.

The temporary memory may be a volatile random access memory.

The display matrix preferably has an array of light emitting diodes each one of which defines a respective display position in the matrix.

The input means may be a switch unit adapted for use by a disabled person.

Other objects, advantages and preferred features of control apparatus in accordance with the present invention will be apparent from the following detailed description of a preferred embodiment of the invention which is given with reference to the accompanying drawings.

BRIEF DESCRIPTION OF THE DRAWINGS

In the drawings:

FIG. 2 is a block diagram of part of the embodiment of FIG. 1, including a display matrix of light emitting diodes and a two-coordinate control therefor;

FIG. 4b is a circuit diagram of the temporary memory and its connections to the units of FIG. 4a;

DETAILED DESCRIPTION OF THE PREFERRED EMBODIMENT

In the embodiment of the control apparatus to be described hereinafter in detail, a display matrix of LEDs responds to two coordinate display input signals representative of display positions each defined by a respective LED in the matrix. An input switch unit adapted for use by a disabled person is coupled to the matrix so that the user can selectively actuate any one of a plurality of the LEDs. To adapt the apparatus to serve as a convenient means of communication, the switch unit is coupled to the matrix by a microprocessor equipped with a ROM holding the operating program for the microprocessor and an RAM in which sets of position coordinates of the matrix can be temporarily stored and recalled under the control of the user so that the user can write a message into the RAM by selecting a sequence of matrix positions corresponding to a sequence of words visibly displayed at respective LEDs and subsequently recall and display the message by selecting a read position in the matrix.

Figure 1:
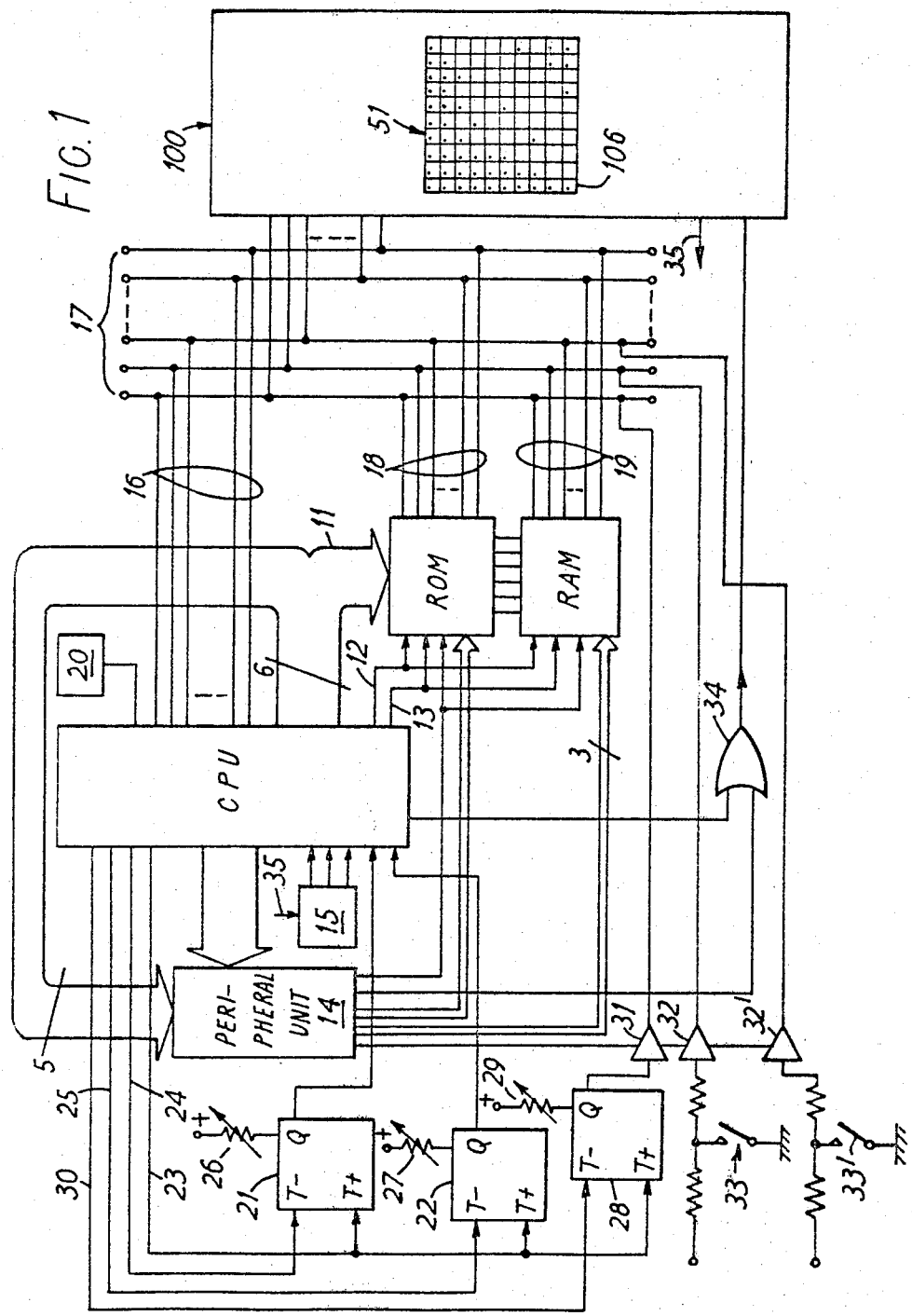
FIG. 1 is a block diagram of an embodiment of the invention showing a central processor unit and memory units.

In FIG. 1, there is shown a central processor unit CPU with a crystal controlled clock pulse generator (not shown) giving a 2 megahertz clock frequency. The central processor unit CPU is an 8-bit processor and has eight output lines arranged in one group of six lines 11 and two further lines 12 and 13 to address a read only memory ROM and a randon access memory RAM in parallel. The processor unit CPU transmits timing and control signals to the memories ROM and RAM through a peripheral unit 14 which is also connected to receive control data on five of the six address output lines 11 of the processor unit CPU.

An input switch unit 15 is coupled to the processor unit CPU and enables a user to instruct the processor unit CPU by simple switching operations. For a user unable to effect manual switching, the switch unit may be adapted to be operated by breath control. For example, one switching operation may be effected by sucking, and another switching operation by puffing.

The central processor unit CPU has eight input/output lines 16 connected respectively to eight lines forming a data bus 17 to which a display unit 100 is connected. The read only memory ROM has in effect, eight output lines 18 respectively connected to the eight lines of the data bus 17, and the random access memory RAM has, in effect, eight input/output lines 19 respectively connected to the data bus lines.

An alarm unit 20, which may be a switchable buzzer, is connected to a flag output line of the processor unit CPU. Two monostable circuits 21 and 22 have respective negative edge and positive edge trigger input terminals T− and T+ connected to three output lines 23, 24 and 25 of the processor unit CPU as shown so that the circuits 21 and 22 can be independently triggered at their respective negative edge trigger input terminals T−. Variable resistors 26 and 27 determine the respective time constants of the circuits 21 and 22, and are manually adjustable so that these time constants can be set by a user or a user's helper. The Q output terminals of the circuits 21 and 22 are respectively connected to two input terminals of the processor unit CPU and in operation each of the circuits 21 and 22 can be triggered repeatedly at a rate determined by a respective time constant determined by the variable resistor 22 or 27 of the monostable circuit.

A further monostable circuit 28 with a time constant determining manually adjustable variable resistor 29 and having its negative edge and positive edge trigger inout terminals T− and T+ connected respectively to an output line 30 and the output line 23 of the processor unit CPU has its Q output terminals couplable through a three state driver 31 controlled by the peripheral unit 14 to the first of the eight lines of the data bus 17.

A further three state driver 32 controlled by the peripheral unit 14 is provided for coupling a positive voltage level or ground level, depending upon whether a manually operable switch 33 is open or closed respectively, to the second of the data bus lines 17. A third three state driver 32 controlled by the peripheral unit 14 is provided for similarly coupling the positive level or ground, depending on the state of a further manually operable switch 33′, to the third of the data bus line 17. The processor unit CPU is programmed to operate in accordance with one or another of three modes of interpreting the signals supplied thereto by the input switch unit 15 depending upon whether both the second and third data bus lines are at the positive or at the positive and ground levels respectively, or vice versa.

Strobe input pulses with a repetition rate of, for example, 500 Hz, are provided at the output terminal of a two input OR gate 34 having its two input terminal connected respectively to an output terminal of the peripheral unit 14 and an output terminal of the processor unit CPU.

The peripheral unit 14 includes two circuits which may together be provided in the form of a 4013 integrated circuit, and two latch decoders in the form of a CDP 1858 integrated circuit.

The input switch unit 15 has three output terminals connected respectively to three input terminals of the processor unit CPU. One of these input terminals is the CLEAR input terminal, and that output terminal of the switch unit 15 to which it is connected provides a high signal whenever either of the other two output terminals of the switch unit is high and throughout activity by the processor unit CPU resulting in the production of strobe pulses at the output of the OR gate 34, information relating to the production of strobe pulses being supplied to the switch unit 15 at an input terminal 35 thereof by means which will be described hereinafter with reference to FIG. 2. Whenever the CLEAR input terminal of the processor unit CPU receives a low signal, the processor unit switches into a quiescent mode.

If the processor unit CPU is in its quiescent mode and the user actuates the switching unit 15, the unit CPU becomes active and a latching high signal appears on the input terminal 35 so that the unit CPU is latched into an active state which does not end until the apparatus is allowed to remain without any input signals from the switch unit 15, apart from the latching signal transmitted from the terminal 35, and in the absence of an alarm condition, for a predetermined time such as five minutes.

While the processor unit CPU is active, input signals from the switch unit 15 are interpreted according to a program stored in the read only memory ROM, the random access memory RAM being used as a temporary store for data received by the processor unit CPU from the switch unit 15. The nature of the program stored in the read only memory ROM and of the data stored temporarily in the random access memory RAM will become apparent from the following description of FIG. 2.

In FIG. 2 the data bus 17 is shown together with its connections to two binary to decimal converters 36 and 37, in the display unit 100. Each of the converters 36 and 37 has four data input terminals and sixteen data output terminals, ten of which output terminals are used. The four data input terminals 38, 39, 40 and 41 of the converter 36 are respectively connected to the last four lines of the data bus 17 as shown, and the four data input terminals 42, 43, 44 and 45 of the converter 37 are connected to the first four lines of the data bus 17. The converters 36 and 37 have respective strobe input terminals ST coupled by an inverter 46 to the output of the OR gate 34 (FIG. 1), and respective inhibit input terminals INH connected to the $\overline{Q}$ output terminal of a monostable circuit 47 triggered at its negative edge trigger input terminal T- by the negative edge of the strobe pulses. The time constant of the monostable circuit 47 is such that the Q output of the circuit 47 remains permanently high during the supplying of an uninterrupted train of strobe pulses to the trigger input terminal T- of the circuit 47. Consequently, the inhibit terminals INH of the converters 36 and 37 remain low while strobe pulses are being supplied. As soon as a train of strobe pulses is interrupted for sufficient time for the monostable circuit 47 to reset, the inhibit terminals INH receive a high signal and the converters 36 and 37 are inhibited.

The Q output terminal of the circuit 47 is coupled to ground level by a resistor 48 with a sliding contact 49 which takes off a bias voltage for a VMOS transistor 50 connected to act as a ground connection switch for a ten-by-ten matrix 51 of light emitting diodes (LEDs).

The ten utilised output terminals of the converter 36 are connected respectively to the basis of ten row switching PNP transistors of which one the first, 52, and the last, 53 are shown. Each row transistor has its emitter connected to a positive power supply and its collector connected to a respective row conductor, of which only the first, 54, and the tenth, 55, are shown. Ten LEDs, with row and column coordinates (R1, C1) to (R1, C10) respectively have their anodes connected to the first row conductor 54, and the other ninety LEDs have their anodes connected in groups of ten to the other nine row conductors, of these diodes those at (R10, C1) and (R10, C10) being shown. The cathodes of the LEDs are connected to ten column conductors in groups of ten, only the first and tenth column conductors 56 and 57 being shown.

Each column conductor is connected to the collector of a respective one of ten NPN column switching transistors, only the first, 58, and tenth, 59, of which are shown. The emitters of the column transistors are connected to the VMOS transistor 50 as shown, and their bases are coupled by respective inverters 60 to the ten utilised output terminals of the converter 37.

During times in which the Q output of the monostable circuit 47 is high, the VMOS transistor 50 conducts, thereby providing a ground connection for the emitters of the column transistors of the matrix 51. The high Q output of the circuit 47 is also supplied to the input terminal 35 of the switch unit 15 (FIG. 1), so that the processor unit CPU becomes quiescent under the circumstances mentioned hereinbefore when the monostable circuit 47 resets, and the converters 36 and 37 are inhibited while the processor unit CPU is quiescent.

When active, the processor unit CPU responds to the program stored in the read only memory ROM, which the unit CPU reads on the data bus 17 at suitable times and causes the converters 36 and 37 to latch in from the last four and first four lines respectively of the data bus 17 the row and column coordinates of LEDs to be energised.

Figure 3:
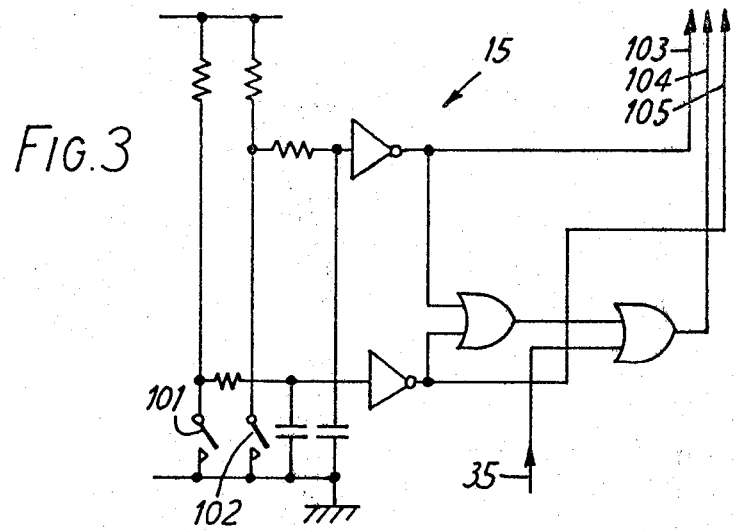
FIG. 3 is a circuit diagram of an input switch unit.

The switch unit 15 has two normally open switches 101 and 102 shown in FIG. 3, one 102 of which can be closed by, for example, sucking on, and the other 101 by, in this example, puffing into a mouth tube (not shown) communicating with means for using the resultant changes from atmospheric pressure to operate the said two normally open switches the respective states of which are separately sensed from signal levels applied to the processor circuit CPU at the two input terminals which together with the CLEAR input terminal are connected to the three output terminals 103, 104 and 105 of the switch unit 15.

In the mode of operation effective when the switch 33' is closed and the switch 33 is open, the normally open switch 102 of the switch unit 15 closed by sucking, referred to hereinafter as the suck switch, is closed to activate the processor unit CPU which thereupon causes the LED at (R1, C1) to be energised. If the suck switch 102 is then closed again and held closed, the successive LEDs of the first row, i.e. at (R1, C2) (R1, C3), and so on, are energised one after the other, and the first LED (R1, C1) being extinguished as soon as the second (R1, C2) is energised, and so on. If the suck switch 102 is held closed for sufficient time, the LED at (R1, C1) will be energised again and the progressing of energisations of the LEDs of the first row will begin again. To stop this horizontal scanning, which is effected at a rate set by the variable resistor 26, the suck switch 102 is opened. Thus any one of the LEDs of the first row can be chosen by the user watching the matrix 51. Having stopped the horizontal scanning at a particular LED, the LEDs of the column which includes that particular LED can be successively energised at the same rate, so that a vertical scan is effected in the same way as the initial horizontal scan, by the user closing and holding closed the other normally open switch 101 of the switch unit 15, which switch is hereinafter referred to as the puff switch 101. A particular LED of the column being scanned can be selected by the user terminating closure of the puff switch 101. Subsequent closure of the suck switch 102 causes the selected LED to flash a minimum number of times set by the variable resistor 27, the flashing continuing throughout the time in which the suck switch 102 is closed and for the preset minimum number of flashes after the suck switch 102 has opened. When the flashing of the selected LED begins the LED at (R1, C1) is energised again and remains energised to serve as a starting point.

In front of an opaque panel in which the ten-by-ten array of LEDs forming the matrix 51 is set, a transparent or translucent sheet (not shown) is mounted which has words or other communications written on it. A ten-by-ten grid 106 of rectangles is marked on the opaque panel, each of the LEDs being set within a respective one of the rectangles. Each word or other communication of the sheet is in position in front of a respective one of the rectangles.

Four of the LEDs of the matrix 51 are associated with special functions affecting the random access memory RAM and the corresponding rectangles of the said grid are provided with suitable inscriptions indicating these functions, e.g. MEMORY WRITE, MEMORY READ BACKSPACE and CALL.

Whenever the CALL LED is selected, the alarm unit 20 is actuated.

When the MEMORY WRITE LED is selected, the LED flashes until the switch 101 or 102 of the input unit 15 is released and then remains energised without flashing, and the (R1, C1) LED is energised. The LED at (R8, C2), (R8, C3), (R8, C4) or (R8, C5) must then be selected. A predetermined maximum number of the other LEDs, including MEMORY READ and BACKSPACE, can be selected during the time that the MEMORY WRITE LED is energised. The sequence of coordinate pairs of the LEDs selected while the MEMORY WRITE LED is energised, except those of BACKSPACE and CALL if selected, is stored in the random access memory RAM. Since this sequence can represent a sequence of words by virtue of the corresponding rectangles of the said grid having words marked in them, the use of the function associated with energisation of the MEMORY WRITE LED enables a phrase or sentence to be, in effect, stored in the random access memory. Subsequently the MEMORY READ LED can be selected in order to begin a reading operation. Again, the LED at (R8, C2), (R8, C3), (R8, C4) or (R8, C5) must be selected next, whereupon the processor unit CPU addresses the random access memory RAM at the locations at which the coordinates of the sequence of LEDs energised during the previous selection of the MEMORY WRITE LED are stored, temporarily stores these coordinates internally, and so controls the display unit 100 as to and cause this same sequence of LEDs to be energised again. Thus a user who may need half an hour to select five LEDs can communicate a five word phrase or sentence in a time determined by the rate of scanning of the LEDs. This reading out of a stored message is repeated a number of times at the rate determined by the variable resistor 29 for a maximum period of 4 minutes 8 seconds.

If a mistake is made in the selection of a word during energisation of the MEMORY WRITE LED, this mistake can be corrected by next selecting the BACKSPACE LED since, when this LED is energised, the processor unit CPU erases the last pair of coordinates stored in the random access memory RAM and enters the coordinates of the next LED selected after the BACKSPACE LED in the locations previously occupied by the erased data.

Whenever the CALL LED, which is preferably the LED at (R1, C10), is selected, the processor unit CPU supplies the flag output actuating the alarm unit 20 and de-energises the MEMORY WRITE LED thereby ending the storing of position coordinates in the random access memory RAM.

In the mode of operation established when the switch 33 is open and the switch 33' is closed, both vertical and horizontal scanning of the matrix 51 can be controlled by one of the switches 101 and 102 of the switch unit 15, horizontal scanning occurring during the closed state of the chosen switch, and vertical scanning occurring automatically during an open state of the same switch following immediately after horizontal scanning. A short closure of the same switch then effects selection. Either one of the switches 101 and 102 can be chosen for this mode, the choice being determined by whichever of the two switches 101 and 102 is closed initially.

In a mode of operation in which the switch 33 and the switch 33' are both open, horizontal and vertical scanning and selection of an LED are all actuated by momentary closure of one of the two switches 101 and 102, the particular result of such closure being determined by the order in sequence of each closure and whether there is a single, isolated momentary closure or two closely occurring momentary closures (for selection of a LED). Again in this mode, either one of the switches 101 and 102 can be chosen, the choice being determined by whichever of the two switches 101 and 102 is closed initially.

The apparatus can be voluntarily set in the quiescent state by closure of a switch 107, FIG. 2, providing a ground connection to a reset terminal R of the monostable circuit 47. Whenever ground is thus applied to the reset terminal R of the circuit 47, its Q output goes low and its Q output goes high, so that a low signal is applied to the input terminal 35 of the switch unit 15 and a high signal is applied to the inhibit input terminals INH of the converters 36 and 37.

Figure 4B:
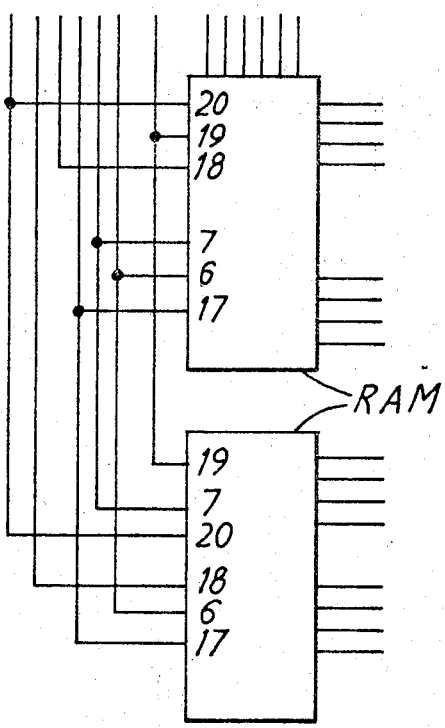
Figure 4A:
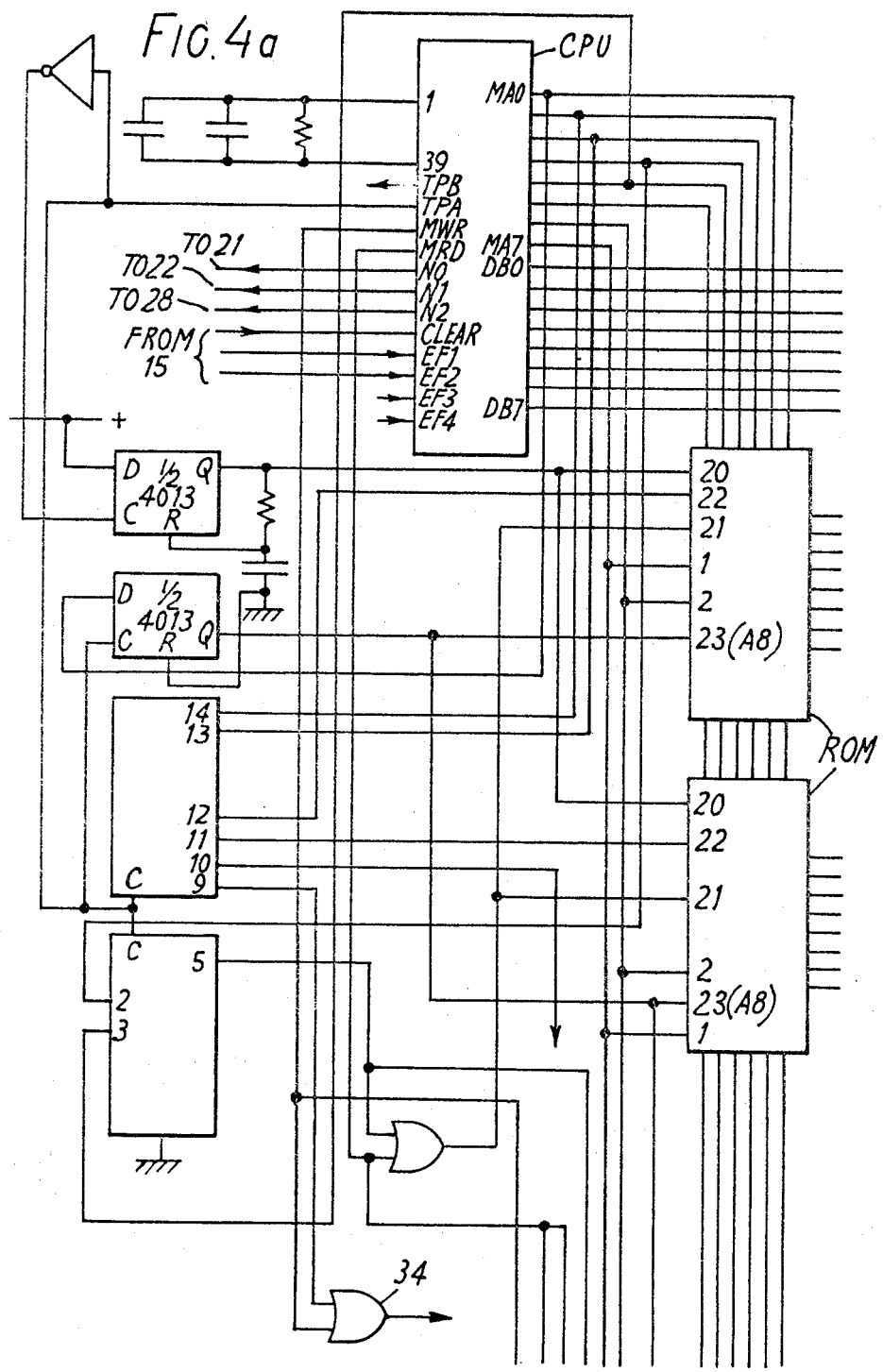
FIG. 4a is a circuit diagram of the central processor unit and control memory and a peripheral unit of the embodiment of FIG. 1.

The central processor unit CPU is preferably an RCA CDP 1802E CMOS microprocessor with a 2.5 megahertz crystal coupled across the 1 and 39 pins, as shown in FIG. 4a. The six output lines 11 are connected to the MA0 to MA5 pins of the microprocessor, and the lines 12 and 13 to the MA6 and MA7 pins. The data bus lines 17 are connected to the eight data bus pins DB0 to DB7. Pins EF1 and EF2 of this microprocessor are connected to the switch unit 15, and pins EF3 and EF4 are respectively connected to the Q output terminals of the monostable circuits 21 and 22, the negative edge trigger terminals T— of which are connected respectively to the pins 19 and 18 of the microprocessor. The pin 35 (MWR) of the microprocessor is connected to one input terminal of the OR gate 34. The pin 34 (TPA) of the microprocessor is connected to the clock input terminals of the CDP 1858 integrated circuit and a latch circuit of the 4013 of the peripheral unit 14, and is coupled through an inverter to the clock input terminal of the other circuit of the 4013, this other circuit being adapted to operate as a monostable circuit for latching the eight least significant bits of the address output of the processor unit into the control memory after the most significant bit has been loaded into this memory at A8 on the rising edge of the 4013 latch Q output. The pin 33 (TPB) is connected to the positive trigger terminals T+ of the three monostable circuits 28, 22 and 21, and the pins 17 (N2), 18 (N1) and 19 (N0) are respectively connected to the negative trigger terminals T—. The pins MA0, MA1, MA3, and MA4 of the microprocessor are also connected respectively to the pin 9 of 4013, which is the D input of the 4013 latch circuit, and pins 14, 13, 2 and 3 of CDP 1858 of the peripheral unit 14.

Pin 3 of 4013 which is the D input of the 4013 monostable circuit, is connected to a positive level, pin 1 of 4013 which is the Q output of the monostable circuit is connected to the address latching input terminals E1 of IM 6654 circuits constituting the read only memory ROM, and pins 1 and 4 are coupled by a resistor, pin 4 being coupled to ground by a capacitor to provide with this resistor the time constant of the monostable circuit. Pin 10 is connected directly to ground.

The read only memory ROM is preferably an EPROM erasable by ultra violet irradiation, in particular two IM 6654 integrated circuits by Intersill having their pins connected as follows:

Pin 1 to MA7 of microprocessor.
Pin 2 to MA6 of microprocessor.
Pins 9 to 17 to data bus lines 17.
Pin 21 to the output of an OR gate with inputs from pin 5 of CDP 1858 and pin 7 (MRD) of microprocessor.
Pins 22 to pins 11 and 12 separately of CDP 1858.
Pin 23 to pin 13 (latch output Q) of 4013.
Pin 20 to pin 1 of 4013.

The random access memory RAM is preferably two CDP 1822E integrated circuits by RCA as shown in FIG. 4b having their pins connected as follows:

Pin 6 to MA6 of microprocessor.
Pin 7 to MA7 of microprocessor.
Pin 17 (chip select) to pin 5 of CDP 1858.
Pin 18 (low to enable output) to pin 7 of microprocessor.
Pin 19 (not chip select) to pin 13 of 4013.
Pin 20 (read/write) to pin 35 of microprocessor.
First CDP 1822E:
Pins 9 and 10 to first data bus line.
Pins 11 and 12 to second data bus line.
Pins 13 and 14 to third data bus line.
Pins 15 and 16 to fourth data bus line.
Second CDP 1822E:
Pins 9 and 10 to fifth data bus line.
Pins 11 and 12 to sixth data bus line.
Pins 13 and 14 to seventh data bus line.
Pins 15 and 16 to eighth data bus line.

In a constructed embodiment employing the particular microprocessor, memories and peripheral unit described hereinbefore, when more than one LED of the matrix 51 is to appear illuminated, the energisation of the two or three LEDs, for example the start LED at (R1, C1), the READ MEMORY LED and a word LED, is multiplexed at the strobe rate of the converters 36 and 37. Data is supplied to the data bus lines 17 and taken off the lines 17 by the microprocessor at the much higher multiplexing rate of the microprocessor.

Figure 5A:
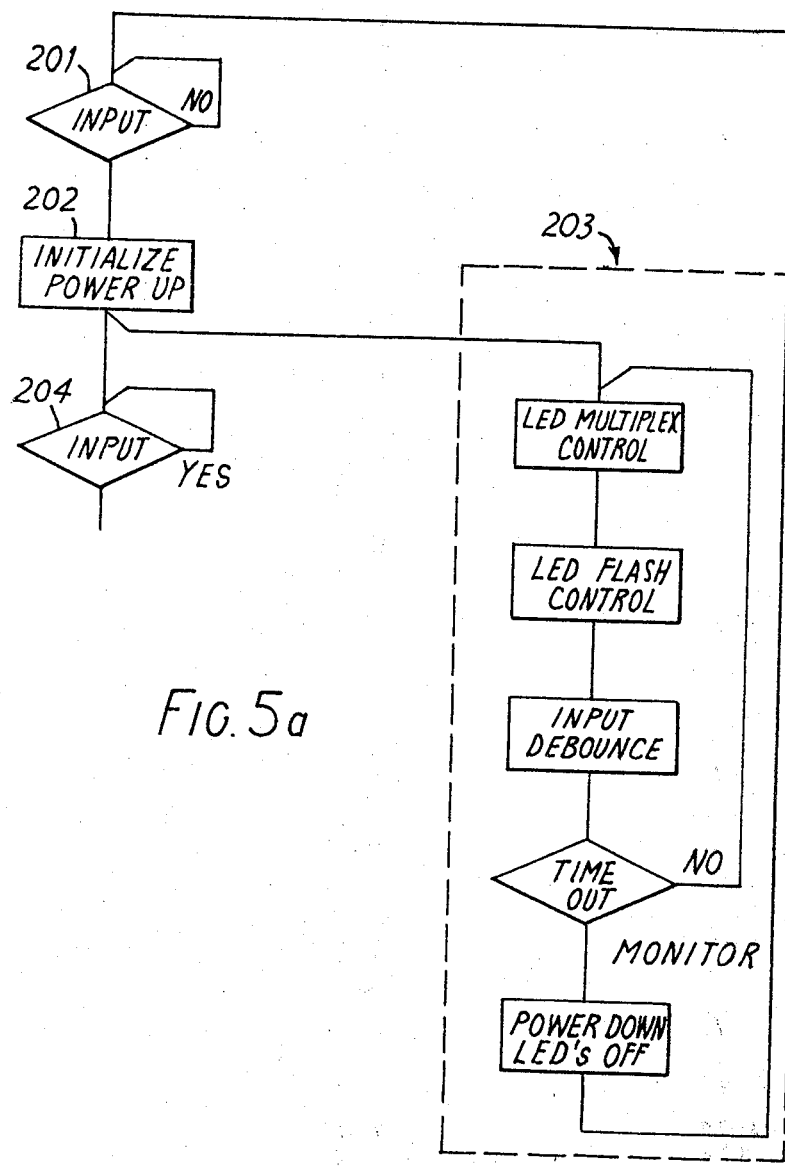
FIGS. 5a, b and c are flow chart diagrams illustrating one mode of operation of the preferred embodiment of FIGS. 1 to 4.

Operation of the apparatus of FIGS. 1 to 4 will now be described with reference to FIGS. 5a, b and c which together show a flow chart for the central processor unit CPU.

The quiescent mode of the processor unit CPU is represented by a decision box 201 in which the unit CPU is continually ready to receive an input from the input switch unit 15. If the unit CPU receives an input from the switch unit 15, ie if either of the switches 101 and 102 is closed, the apparatus proceeds to initialize and to energize the matrix 51 at (R1, C1), as indicated by an INITIALIZE and POWER UP process box 202. The processor unit CPU also proceeds to a monitoring routine which is carried out continually but multiplexed at approximately 1 millisecond intervals with other routines so as to run for about 50% of the time, during the active state of the unit CPU. The monitoring routine is represented at 203 in FIG. 5a and consists of a sequence of processes; LED MULTIPLEX CONTROL, LED FLASH CONTROL, INPUT DEBOUNCE, followed by a decision: TIME OUT after which, if the answer is NO, this sequence of processes is repeated. The occurrence of the LED MULTIPLEX CONTROL process determines the time at which up to four of LEDs of the matrix 51 are multiplexed, and the LED FLASH CONTROL process determines whether or not the energized LED is flashed. When a selection is made, the LED at the selected matrix position is flashed for as long as the input switch being used is closed and thereafter for the predetermined time interval set by the monostable circuit 22. The INPUT DEBOUNCE process is such that any change in the state of the effective input switch is taken as an input command provided that the change does not take place within a predetermined set time interval started at the last change in its state. This process provides a rapid response to input from the input switch unit 15. The set time interval in which changes are ignored is made longer for the suck switch 102 than for the puff switch 101, if necessary in view of the different manners in which a user actuates the two switches 101 and 102. The decision TIME OUT times the interval after each effective operation of either switch of the switch unit 15 and if the interval exceeds a predetermined time-out interval of about three minutes, the decision is YES and instead of the next monitor process being LED MULTIPLEX CONTROL it is POWER DOWN, LEDs OFF, which results in ending of writing or reading of the RAM, if current, de-energizing of the matrix LEDs, and return of the processor unit CPU to its quiescent state at decision box 201.

Figure 5B:
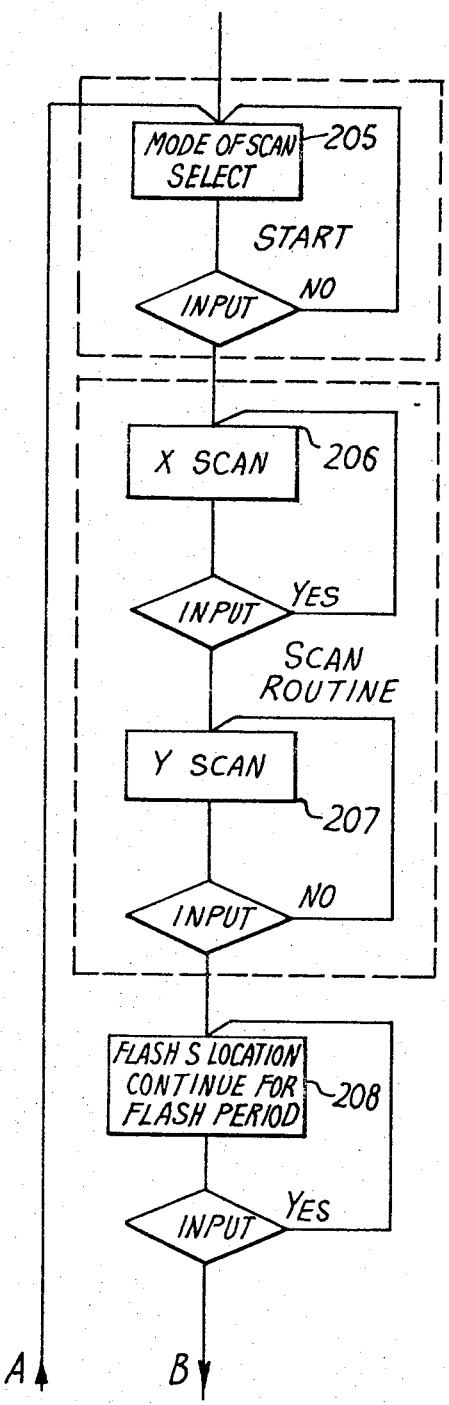

Multiplexed with the monitoring routine, a START routine is entered after INITIALIZE and POWER UP if the answer to a decision which monitors for presence of an input signal, as represented by a decision box 204, is NO. The first process in the START routine, which is the only process and continues until the next input signal occurs, is represented by a process box 205 in FIG. 5b for MODE OF SCAN SELECT. In this process, the processor unit CPU monitors the three state drivers 32 and 32' to discover which mode of scanning has been selected. At the occurence of a START routine decision YES to the presence of an input from the switch unit 15, the processor unit CPU proceeds to the routine for the selected mode of scanning. In FIG. 5b, the routine for the scanning mode in which horizontal, i.e. X, scanning is carried out in response to closure of the switch 101 or 102 being used, vertical, i.e. Y, scanning is carried out automatically in response to opening of same switch 101 and 102, and selection of a LED is effected by the next subsequent closure of that same switch. Thus, in the SCAN ROUTINE illustrated, the presence of an input results immediately in an X SCAN process at box 206 which continues until the decision INPUT:NO occurs, whereupon a Y SCAN process at box 207 immediately follows and continues until the decision INPUT:YES occurs. The occurrence of Y SCAN AND INPUT:YES results immediately in selection of the LED energized at the time of this occurence, i.e. scanning ceases and this selected LED, referred to as S LOCATION in FIG. 5b, is flashed during and after selection, as indicated by a process box 208 inscribed FLASH S LOCATION CONTINUE FOR FLASH PERIOD. The latter part of this process, i.e. CONTINUE FOR FLASH PERIOD occurs after the decision indicated for simplicity as occurring subsequently, that there is no INPUT. Point B in the flow chart therefore occurs at the end of the FLASH PERIOD. From the point B, as shown in FIG. 5c, the operation of the apparatus enters a route along which the processor unit CPU monitors to discover what LED is selected and whether the selected LED requires a response resulting in operation of the alarm unit 20, a step in the writing of information in the temporary memory RAM, or reading from the memory RAM. The first decision, at box 209, is for the CALL response, referred to as BUZZ ROUTINE, in a process box 210. If $S=B_Z$ in box 209, i.e. the LED at the matrix position inscribed CALL is selected, the processor unit CPU proceeds to the BUZZ ROUTINE process in which the alarm buzzer 20 buzzes. In this process, the buzzer 20 produces short buzzes or "beeps" at intervals of about one second until sixteen have been counted by the processor unit CPU, or an input occurs before sixteen, whereupon the BUZZ ROUTINE ends and a process of resetting, if necessary, certain possible selections indicated by MX, MW and MR in FIG. 5c and writing, if necessary, "end of memory" in the temporary memory RAM is carried out as indicated by a process box 211. This process is followed by the process of resetting, i.e. deenergizing any other selected LED and returning the selected LED position to the top left hand corner of the matrix 51 as indicated by a process box 212 leading to a point A in the flow chart which returns the apparatus to the START routine of FIG. 5b.

If the decision at box 209 is NO, the processor unit CPU enquires whether MW and MX are set at a box 213. If the decision here is NO, the unit CPU enquires whether $S=X$ where X is any one of four LED locations designated locations 1, 2, 3 and 4 and corresponding the matrix positions (R8, C2), (R8, C3) (R8, C4) and (R8, C5) respectively. Thus the unit CPU discovers whether or not a writing or reading operation is required. If the answer to $S=X$ is YES, as indicated at a decision box 214, a process SET MX at a box 215 is carried out. To distinguish between writing and reading, after the SET MX process, the CPU enquires whether MW is already set, and if the answer is NO at box 216, the CPU enquires at box 217 whether MR is already set. If the answer is again no, the RESET processes at box 211 and box 212 are carried out.

If the answer at $S=X$ in box 214 is NO, then CPU asks whether $S=W$ at a box 218. If the selected LED at this decision is not the LED for writing, i.e. not W, then the CPU next asks whether $S=R$, i.e. whether the selected LED is the LED for reading R. If the answer is again NO, the resetting processes at boxes 211 and 212 are carried out. If at box 218 the answer is YES, MW is set by a process indicated at a box 219. If at the box 218 the answer is NO but the answer at a subsequent decision box 220 is YES indicating that S=R, then MR is set by a process indicated at a box 221. The process boxes 219 and 221 both lead to the reset process box 212.

If the decision at box 216 is reached and the answer is YES, then the apparatus is returned to the START ROUTINE by box 212 and waits for the user to actuate the apparatus again to reach the decision at the box 213 whereupon the answer will be YES and the WRITE routine is entered at a process box 222. The WRITE routine consists of FIG. 5b and boxes 209, 213 and 222, a decision box 223 and box 212 of FIG. 5c. The matrix coordinates of LEDs selected during the WRITE routine are pushed onto a stack. The WRITE routine ends when this stack is full, or the MEMORY WRITE LED (S=W) is selected, or the CALL LED (S=Bz) is selected, or TIME OUT=YES in the MONITOR routine 203 of FIG. 5a. Selection of the BACKSPACE LED pops the stack one but this process is not displayed. If the BACKSPACE process goes past the start of the stack, the CPU reverts to normal operation, i.e. neither writing nor reading. Thus, whenever the decision at the box 223 is YES, the resetting processes at 211 and 212 are carried out, "end of memory" being written in the RAM.

If from point B in the flow chart the CPU proceeds to the box 217 and the answer is YES, the reading routine is entered. This routine consists of a process, indicated by a box 224, of displaying the contents of the temporary memory stack by popping to the matrix 51. The reading routine ends if an input from the switch unit 15 is received or the stack is empty, as indicated by a decision box 225. Thus when the decision is YES at the box 225, the resetting processes of boxes 211 and 212 are carried out.

The processes and decisions for the other two modes of scanning will be apparent to those skilled in the art from the description of the operation of the apparatus given hereinbefore.

Figure 6:
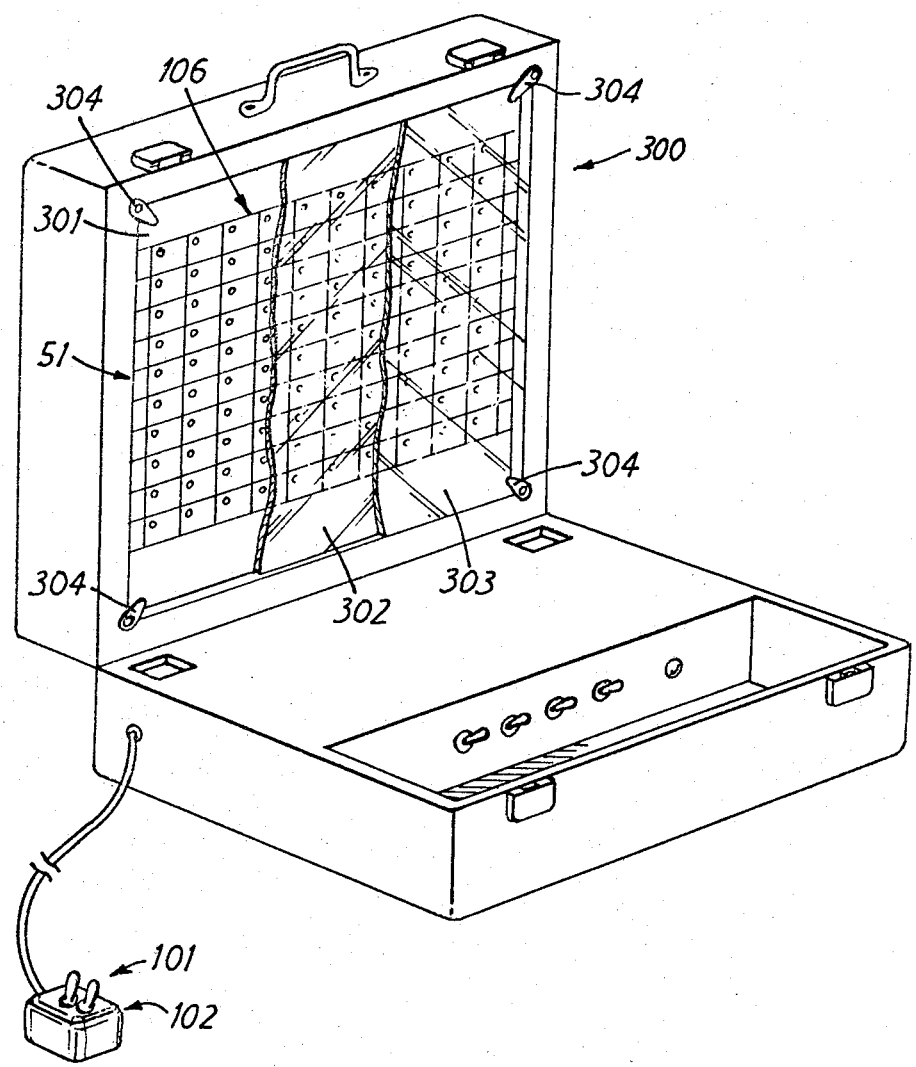
FIG. 6 is a simplified perspective view of a housing containing the preferred embodiment of FIGS. 1 to 4.

FIG. 6 shows an example of housing of the control apparatus of FIGS. 1 to 4 in an adapted suitcase or attache case 300. The switches 101 and 102 are in this instance manually operable toggle switches. The matrix 51 of one hundred LEDs is shown mounted in an opaque panel 301 having the ten-by-ten grid 106 of rectangles marked on it. A sheet 302 of transparent plastics material lies in front of the panel 301 and is held in place by a rigid transparent sheet 303 located in the case 300 and secured by four corner clamps 304.

Although in FIG. 6 the two parts of the case 300 are indicated as both holding parts of the control apparatus, it may be preferred to mount the entire control apparatus, apart from the switches 101 and 102 of the switch unit 15 in one part of such a case and use the other part simply as a hinged, detachable and lockable cover. In either case, the apparatus can be powered by batteries within the case, and the switches of the switch unit 15 can be connected by a cable and a suitable plug and socket connection to the case.

We claim:

1. In a control apparatus for a display matrix adapted for use as a means of communication by a disabled person and comprising display matrix means defining a plurality of electrically actuable display positions and responsive to electrical display input signals representative of display positions in said matrix means; temporary memory means for storing in a predetermined ordered group of sets of locations thereof a plurality of sets of display position data corresponding to selected display positions; matrix and memory addressing means coupled to said display matrix means and to said temporary memory means to supply respectively thereto electrical display input signals and display position data; and user actuable input switch means remote from the matrix means and coupled to said matrix and memory addressing means to supply distinguishable control signals thereto having predetermined respective significances, said matrix and memory addressing means responding differently to said distinguishable control signals, in dependence upon the respective significances thereof, to selectively actuate any user chosen one of said display positions, to cause a plurality of sets of display position data corresponding to successive selected display positions to be stored in the said group of sets of locations, and to read said stored sets of display data from said temporary memory means in said predetermined order and actuate said corresponding plurality of display positions of said display matrix means, the improvement comprising: said matrix and memory addressing means comprising central processor means; control memory means coupled to said central processor means to be addressed thereby and to supply data thereto in accordance with a program contained in said control memory means for said central processor means; and timing and decoding means coupled to said control memory and temporary memory means and adapted to selectively enable the respective memory means in accordance with commands supplied by said central processor means to said timing and decoding means; said user actuable input switch means being arranged to allow a user to generate different distinguishable control signals; said central processor means being adapted to operate in accordance with said program in said control memory means to respond to a predetermined pattern of user actuation of said switch means to selectively actuate any user chosen one of said display positions; said display positions including a write region and a read region; and said control memory means with said program being such that, in response to the selected actuation of said write region said central processor means, in accordance with said program, causes a plurality of sets of display position data corresponding to subsequently actuated selected display positions chosen by the user to be stored in said predetermined ordered group of sets of locations in said temporary memory means, and in response to the selected actuation of said read region said central processor means, in accordance with said program, automatically reads the stored sets of display position data from said temporary memory means in said predetermined order and actuates said corresponding plurality of display positions of said display matrix means in the corresponding order.

2. Control apparatus as claimed in claim 1, wherein the display matrix means includes an erasing display position, in response to selection of which during actuation of the write position the most recent set of display position data is erased.

3. Control apparatus as claimed in claim 1 wherein the control memory means is a read only memory programmed to determine a mode of operation of the central processor means in response to predetermined signals from the input means.

4. Control apparatus as claimed in claim 1, wherein the temporary memory means is a volatile random access memory.

5. Control apparatus as claimed in claim 1, wherein the display matrix means has an array of light emitting diodes each one of which defines a respective display position in the matrix means.

6. Control apparatus as claimed in claim 1, wherein the input means is a switch unit adapted for use by a disabled person.

* * * * *